United States Patent Office 3,271,376
Patented Sept. 6, 1966

1

3,271,376
CATALYST SYSTEM FOR THE COPOLYMERIZATION OF OLEFINS
Marco A. Achon, Chester, and John A. Price, Swarthmore, Pa., assignors to Avisun Corporation, Philadelphia, Pa., a corporation of Delaware
No Drawing. Filed Aug. 30, 1962, Ser. No. 220,556
10 Claims. (Cl. 260—88.2)

This invention relates to a novel catalyst system for the polymerization of mixtures of olefins, and more particularly to a catalyst system for the polymerization of mixtures of ethylene and propylene to form amorphous copolymers which may be vulcanized to form a high quality, ozone resistant, synthetic rubber.

The copolymerization of ethylene and propylene in the presence of a coordination complex catalyst such as the reaction product of vanadium oxytrichloride and aluminum triisobutyl in a liquid hydrocarbon reaction solvent for the olefins to yield a product resembling unvulcanized rubber is known to the art, and is described in Belgian Patent 553,665. These copolymers may be cross-linked by means of peroxides or other free radical generators to form a saturated elastomer which is highly resistant to ozone. It is also known to copolymerize ethylene and propylene, or another alpha olefin, with a diolefin such as cyclopentadiene, in order to introduce unsaturation into the molecule to permit the terpolymer to be cross-linked by standard rubber recipes. Such terpolymers are shown in U.S. Patent 3,000,866. In such processes, utilizing catalyst systems known to the prior art, there are always produced, along with the desired copolymer, small amounts of crystalline homopolymers of ethylene or propylene, or a copolymer containing long blocks of ethylene or propylene homopolymer which appear to be crystalline by X-ray analysis. This type of polymer is insoluble in the solvent, and, if it is left in the final product, the properties of the vulcanized copolymer are adversely affected, as pointed out in copending application S.N. 103,710 of Cassar et al., now U.S. Pat. 3,071,566. While the insoluble polymer can be removed from the soluble polymer as described in this application, the removal requires an additional process step, and adds to the cost of the process.

It is an object of this invention to provide a family of catalyst systems for the copolymerization of ethylene and another alpha olefin such as butene-1 or propylene, either alone or with one or more other olefins or diolefins, which will cause copolymerization at a commercially attractive rate, and which will not produce more than trace quantities of polymer which is insoluble in the solvent.

It has been found according to the present invention that catalyst systems which are the reaction products of vanadium oxytrichloride or vanadium tetrachloride, an alkyl aluminum dihalide, and an alkoxy silane are effective to accomplish the foregoing object. The aluminum component of the catalyst system of this invention may

2 be any alkyl aluminum dihalide such as ethyl aluminum dichloride, propyl aluminum dichloride, butyl aluminum dichloride, isobutyl aluminum dichloride, or the corresponding bromine or iodine analogues, as well as alkyl aluminum dihalides, the alkyl radicals of which contain a greater number of carbon atoms than those illustrated above. The silane component of this invention may be any alkoxy silane having the formula $R_4Si$, in which at least one R is alkoxy and the remaining R's, if any, are hydrocarbon radicals, such as trimethyl ethoxy silane, diethyl diethoxy silane, tetramethoxy silane, tetraethoxy silane, or triphenyl ethoxy silane. The mol ratio of alkyl aluminum dihalide to silane oxygen should not be below about 1:1, since at this ratio polymerization is quite slow, nor should the ratio be above about 100:1. A practical working ratio lies in the range between about 1:1 to 10:1. The ratio of aluminum to vanadium should be from about 0.2:1 to 10:1, preferably from about 1.5:1 to 5:1. As the solvent, any liquid which will not react with the catalyst may be used, such as, for example, hexane, heptane, octane or mixtures of aliphatic liquid hydrocarbons, benzene, toluene, or chlorinated hydrocarbons such as tetrachloroethylene.

In carrying out polymerization in accordance with the present invention, the catalyst components are added to the solvent, which should be essentially free from water or oxygen. The solvent is then brought to a temperature of from about 20° C. to about 200° C., preferably from about 40° C. to about 80° C., and the ethylene-propylene feed is pressured into the reactor at pressures of from about 10 p.s.i.g. to 250 p.s.i.g., preferably from about 40 p.s.i.g. to 150 p.s.i.g. The mol ratio of ethylene to the other alpha olefin in the feed should be from about 20:80 to 80:20, depending on the amount of ethylene which it is desired to incorporate into the polymer. When it is desired to produce a polymer containing unsaturation, the diolefin should be present in an amount to yield from about 0.5% to 5% unsaturation. The diolefin may be added at the start of the polymerization, or it may be added in increments as the polymerization proceeds.

The data in the following table will illustrate the advantages of the invention. In Experiments 1 through 51 the polymerization time was one hour, polymerization temperature was 70° C., the solvent was 100 ml of hexane, the feed was 60 mol percent ethylene and 40 mol percent of propylene, and the total pressure was 45 p.s.i. The reactor was a pressure bottle equipped with a magnetic stirrer. The vanadium component of the catalyst system was vanadium oxytrichloride, and the aluminum component was aluminum ethyl dichloride. In Experiments 52, 53, and 54 the vanadium component of the catalyst was vanadium tetrachloride, the mol ratio of ethylene to propylene was 30:70 and the polymerization temperature was 40° C. Polymerization time in Experiment 52 was one hour, in 53 and 54, one half hour.

| Exp. No. | Silane | Mol Ratio Al/V/Silane | Millimoles Vanadium Compound | Polymer Total | Obtained (grams) Insolubles |
|---|---|---|---|---|---|
| 1 | $(CH_3)_2Si(OEt)_2$ | 3:1:2 | 0.287 | 4.35 | Trace. |
| 2 | $(CH_3)_2Si(OEt)_2$ | 3:1:3 | 0.287 | 3.74 | None. |
| 3 | $(CH_3)_2Si(OEt)_2$ | 2:1:.50 | 0.287 | 3.05 | Trace. |
| 4 | $(CH_3)_2Si(OEt)_2$ | 2:1:1 | 0.287 | 3.29 | None. |
| 5 | $(CH_3)_2Si(OMe)_2$ | 2:1:.5 | 0.287 | 2.66 | Trace. |
| 6 | $(CH_3)_2Si(OMe)_2$ | 2:1:1 | 0.287 | 1.55 | None. |
| 7 | $(EtO)_4Si$ | 2:1:.15 | 0.287 | 2.60 | Do. |
| 8 | $(EtO)_4Si$ | 2:1:.2 | 0.287 | 2.84 | Trace. |
| 9 | $(EtO)_4Si$ | 2:1:.25 | 0.287 | 3.92 | None. |
| 10 | $(EtO)_4Si$ | 2:1:.5 | 0.287 | 3.41 | Do. |

| Exp. No. | Silane | Mol Ratio Al/V/Silane | Millimoles Vanadium Compound | Polymer Total | Obtained (grams) Insolubles |
|---|---|---|---|---|---|
| 11 | $(CH_3)_2Si(OMe)_2$ | 3:1:1 | 0.287 | 3.21 | Trace. |
| 12 | $(CH_3)_2Si(OPr)_2$ | 3:1:1 | 0.287 | 4.02 | None. |
| 13 | $(Ph)_2Si(OMe)_2$ | 3:1:.5 | 0.287 | 4.18 | Do. |
| 14 | $(Ph)_2Si(OMe)_2$ | 3:1:1 | 0.287 | 4.11 | Do. |
| 15 | $(Ph)_2Si(OMe)_2$ | 3:1:2 | 0.287 | 2.99 | Do. |
| 16 | $(Ph)_2Si(OEt)_2$ | 3:1:.5 | 0.287 | 4.09 | Do. |
| 17 | $(Ph)_2Si(OEt)_2$ | 3:1:1 | 0.287 | 4.22 | Do. |
| 18 | $(Ph)_2Si(OPr)_2$ | 3:1:.5 | 0.287 | 3.64 | Do. |
| 19 | $(Ph)_2Si(OPr)_2$ | 3:1:1 | 0.287 | 3.51 | Do. |
| 20 | $(Ph)_2Si(OBu)_2$ | 3:1:.5 | 0.287 | 3.79 | Trace. |
| 21 | $(Ph)_2Si(OBu)_2$ | 3:1:1 | 0.287 | 3.90 | None. |
| 22 | $(CH_3)_2Si(OEt)_2$ | 3:1:1 | 0.287 | 4.80 | Do. |
| 23 | $(CH_3)_2Si(OEt)_2$ | 3:1:2 | 0.287 | 4.37 | Do. |
| 24 | $(CH_3)_2Si(OEt)_2$ | 3:1:3 | 0.287 | 3.77 | Do. |
| 25 | $(CH_3)_3SiOEt$ | 4:1:.5 | .47 | 3.33 | Do. |
| 26 | $(CH_3)_3SiOEt$ | 4:1:1 | .47 | 3.64 | Do. |
| 27 | $(CH_3)_3SiOEt$ | 4:1:1:.5 | .47 | 3.41 | Do. |
| 28 | $(CH_3)_3SiOEt$ | 4:1:2 | .47 | 3.70 | Do. |
| 29 | $(CH_3)_3SiOEt$ | 4:1:3 | .47 | 3.35 | Do. |
| 30 | $(CH_3)_2Si(OEt)_2$ | 4:1:.05 | .47 | 4.25 | Do. |
| 31 | $(CH_3)_2Si(OEt)_2$ | 4:1:.1 | .47 | 4.42 | Do. |
| 32 | $(CH_3)_2Si(OEt)_2$ | 4:1:.3 | .47 | 4.67 | Do. |
| 33 | $(CH_3)_2Si(OEt)_2$ | 4:1:1 | .47 | 5.91 | Do. |
| 34 | $(CH_3)_2Si(OEt)_2$ | 4:1:2 | .47 | 5.40 | Do. |
| 35 | $(CH_3)_2Si(OEt)_2$ | 4:1:3 | .47 | 4.0 | Do. |
| 36 | $(EtO)_4Si$ | 4:1:.25 | .47 | 4.82 | Do. |
| 37 | $(EtO)_4Si$ | 4:1:1 | .47 | 5.17 | Do. |
| 38 | $(Ph)_2Si(OMe)_2$ | 4:1:2 | .47 | 4.86 | Do. |
| 39 | $(PrO)_4Si$ | 3:1:.75 | .287 | 2.37 | Do. |
| 40 | $(CH_2=CH-CH_2O)_4Si$ | 3:1:.25 | .287 | 3.57 | Do. |
| 41 | $(CH_2=CH-CH_2O)_4Si$ | 3:1:.4 | .287 | 2.93 | Do. |
| 42 | $(CH_2=CH-CH_2O)_4Si$ | 3:1:.5 | .287 | 2.47 | Do. |
| 43 | (cyclohexyl $O)_4Si$ | 3:1:.25 | .287 | 2.10 | Do. |
| 44 | (2 ethyl n-butyl $O)_4Si$ | 3:1:.25 | .287 | 3.68 | Do. |
| 45 | (2 ethyl n-butyl $O)_4Si$ | 3:1:.5 | .287 | 2.78 | Do. |
| 46 | (2 ethyl n-butyl $O)_4Si$ | 3:1:.75 | .287 | 2.22 | Do. |
| 47 | $(CH_3)_2(PrO)_2Si$ | 2:1:.25 | .287 | 3.32 | Do. |
| 48 | $(CH_3)_2(PrO)_2Si$ | 2:1:.5 | .287 | 3.06 | Do. |
| 49 | none | 4:1:0 | .287 | 1.81 | Trace. |
| 50 | none | 3:1:0 | .287 | 2.40 | Do. |
| 51 | none | 2:1:0 | .287 | 1.74 | Do. .05 |
| 52 | $(CH_3)_2(EtO)_2Si$ | 3:1:2 | .287 | 2.89 | Trace. |
| 53 | $(CH_3)_2(EtO)_2Si$ | 3:1:2 | .287 | 2.70 | Do. |
| 54 | $(CH_3)_2(EtO)_2Si$ | 3:1:3 | .287 | 2.31 | Do. |

In the above tables, Ph is phenyl, OMe is methoxy, OEt is ethoxy, OPr is propoxy, and OBu is butosxy.

It will be noted that in 43 of the 51 runs made with the catalyst systems containing the silane not even trace quantities of insoluble polymer were made, and in all instances the yeld of polymer was much greater than the yields in the control runs, without the silane.

The new catalyst systems may also be used to co-polymerize ethylene, propylene and a diolefin to yield a sulfur-vulcanizable terpolymer. Data from terpolymerization runs are reflected in the following table. In these runs the solvent was 100 ml. of benzene, with the exception of runs 13 and 14, where hexane was used, pressure was 45 p.s.i.g., the feed was 30% ethylene and 70% propylene, and one third the indicated amount of dicyclopentadiene was charged to the reaction bottle at the beginning of the reaction, one third after 7 minutes, and one third after 15 minutes. Reaction temperature was 40° C., and reaction time was one half hour. The Al/V/Si ratio was 3:1:1, and the catalyst level was 0.287 millimoles of $VOCl_3$. The aluminum component of the catalyst was aluminum ethyl dichloride.

| | Silane | DCPD (ml.) | Yield (g.) | Mol percent unsaturation |
|---|---|---|---|---|
| 1 | $Ph_2Si(OEt)_2$ | .19 | 1.94 | 0.67 |
| 2 | $Ph_2Si(OEt)_2$ | .39 | 1.81 | 1.02 |
| 3 | $Ph_2Si(OEt)_2$ | .51 | 1.84 | |
| 4 | $Ph_2Si(OMe)_2$ | .19 | 2.36 | 0.72 |
| 5 | $Ph_2Si(OMe)_2$ | .39 | 2.58 | |
| 6 | $Ph_2Si(OMe)_2$ | .51 | 2.26 | |
| 7 | $Ph_2Si(OMe)_2$ | .69 | 2.27 | 0.52 |
| 8 | $Ph_2Si(OMe)_2$ | .99 | 2.20 | |
| 9 | $Me_2Si(OEt)_2$ | .19 | 2.65 | |
| 10 | $Me_2Si(OEt)_2$ | .39 | 2.74 | 1.0 |
| 11 | $Me_2Si(OEt)_2$ | .51 | 2.55 | |
| 12 | $Me_2Si(OEt)_2$ | .69 | 2.62 | 1.22 |
| 13 | $Me_2Si(OEt)_2$ | .19 | 3.37 | |
| 14 | $Me_2Si(OEt)_2$ | .39 | 3.23 | |

In all cases no insoluble polymer was formed, and the product could be cross-linked with a standard rubber recipe containing no peroxide, proving that the dicyclopentadiene had entered into the polymer chain.

The invention claimed is:

1. A catalyst system which consists essentially of the reaction product of an aluminum alkyl dihalide, a vanadium compound selected from the group consisting of vanadium tetrachloride, and vanadium oxytrichloride, and a silane of the formula $R_3R'Si$, in which R' is an alkoxy radical, and R is selected from the group consisting of alkoxy radicals and hydrocarbon radicals.

2. The catalyst system according to claim 1 in which the mol ratio of aluminum alkyl dichloride to silane is from 1:1 to 100:1 and the mole ratio of aluminum alkyl dichloride to the vanadium compound is from 0.2:1 to 10:1.

3. The catalyst system according to claim 2 in which the aluminum alkyl dihalide is aluminum ethyl dichloride.

4. The catalyst system according to claim 3 in which the silane is tetraethoxy silane.

5. The catalyst system according to claim 3 in which the silane is dimethyl diethoxy silane.

6. The catalyst system according to claim 3 in which the silane is dimethyl dimethoxy silane.

7. The catalyst system according to claim 3 in which the silane is diphenyl diethoxy silane.

8. The catalyst system according to claim 3 in which the silane is trimethyl ethoxy silane.

9. A process for the copolymerization of ethylene and propylene which comprises contacting, in an inert solvent, and at a temperature of from about 20° C. to about 200° C., a mixture of ethylene and propylene with a catalyst consisting essentially of the reaction product of an aluminum alkyl dihalide, a vanadium compound selected from the group consisting of vanadium tetrachloride, vanadium oxytrichloride, and a silane of the formula $R_3R'Si$ in which $R'$ is an alkoxy radical and R is selected from the group consisting of alkoxy radicals and hydrocarbon radicals, wherein the mol ratio of aluminum alkyl dihalide to silane is from 1:1 to 100:1 and the mol ratio of aluminum alkyl dihalide to vanadium oxytrichloride is from 0.2:1 to 10:1.

10. The process according to claim 9 in which the aluminum alkyl dihalide is aluminum ethyl dichloride.

References Cited by the Examiner
UNITED STATES PATENTS

| | | | |
|---|---|---|---|
| 2,886,561 | 5/1959 | Reynolds | 260—94.9 |
| 3,048,574 | 8/1962 | Wiberg | 260—93.7 |

JOSEPH L. SCHOFER, *Primary Examiner.*

F. L. DENSON, *Assistant Examiner.*